Aug. 23, 1932.  G. E. HALLENBECK  1,873,396
CONTROL MAINTENANCE IN HYDRAULIC TRANSMISSIONS
Filed Jan. 25, 1929
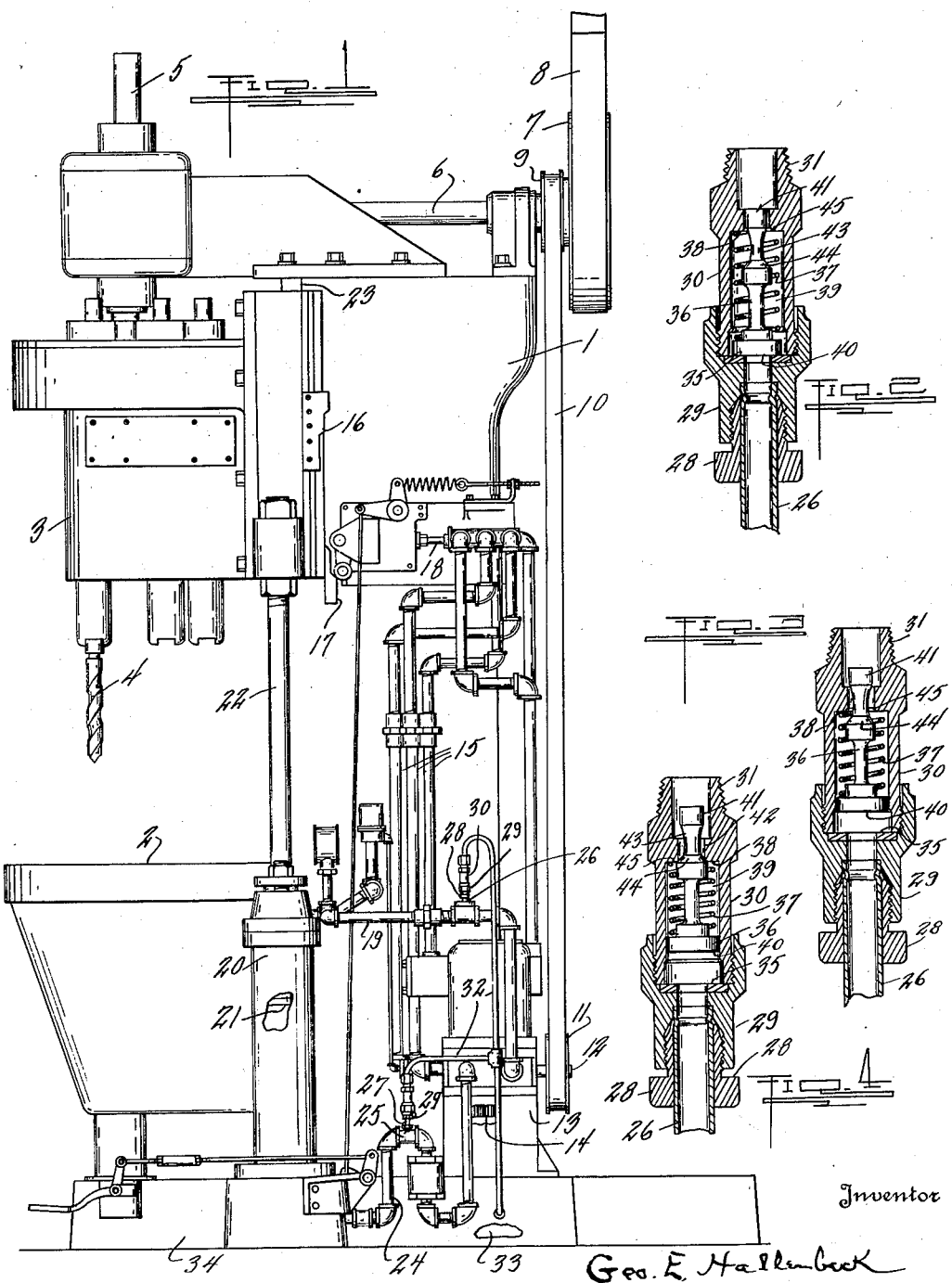
Inventor
Geo. E. Hallenbeck
By Geo E Kirk
Attorney Patented Aug. 23, 1932

1,873,396

UNITED STATES PATENT OFFICE

GEORGE E. HALLENBECK, OF TOLEDO, OHIO, ASSIGNOR TO BAKER BROTHERS, INC., OF TOLEDO, OHIO, A CORPORATION OF OHIO

CONTROL MAINTENANCE IN HYDRAULIC TRANSMISSIONS

Application filed January 25, 1929. Serial No. 335,136.

This invention relates to transmission by definite control means.

This invention has utility when incorporated in connection with hydraulic transmissions, having especial utility in the so-called oil gear transmissions, as for the elimination of compressible media, as gases, and thereby maintaining incompressible liquid in the circuit for control, say of the drill travel in a machine tool of the drill press type.

Referring to the drawing:

Fig. 1 is a side elevation, with parts broken away, of an embodiment of the invention in a drill press;

Fig. 2 is a detail view, in section, of the relief valve for the gases as incorporated in the structure of Fig. 1, showing the valve in initial or low pressure closed position;

Fig. 3 is a view similar to Fig. 2, showing the valve with its plunger in its intermediate position for spill of compressible medium from the transmission circuit; and Fig. 4 is a view similar to Fig. 2, showing the high pressure closed position of such valve.

Machine tool frame 1 is shown as having work table 2. Over such work table is head 3 carrying rotatable drill press tool 4 as rotated by spindle 5 from shaft 6 having pulley 7 driven by belt 8. This shaft 6 has additionally thereon pulley 9 effective through belt 10 for driving pulley 11 on shaft 12 carried by housing 13 having therein measuring gear type rotary pump 14, the feed flow of which is regulated by lines 15 affected by controlling cams 16, 17, operating control plunger 18.

From this flow controller or pump 14, extends line 19 to the upper portion of cylinder 20 having piston 21 therein connected to piston rod 22 extending to reciprocate drill press tool head 3 on guides 23 of the frame 1. Power fluid as thus directed by the line 19 into the upper end of the cylinder 20 will act upon the member to be actuated or piston 21 to thrust such downward in the cylinder 20.

The control for reverse operation from the pump 14 is by line 24 having high point 25 therein and extending to lower end of the cylinder 20, thus to act on the underside of the member 21 to be actuated and lifting the head 3.

A branch 26 leads from the high point in line 19, while from high point 25 in the line 24 is branch 27. These branches have union connection by fittings 28, 29, to shell 30 terminating in threaded head 31 extending by lines 32, to spill into reserve chamber or reservoir 33 in base 34 of the machine tool 1. The fitting 29 has therein seat 35 against which is thrust plunger 36 as actuated by spring 37 seated at its remote point against shoulder 38 of the shell 30, 31, providing chamber 39 for this spring and plunger. This plunger 36 has terminal shoulder 40 seating at the seat 35. The remote portion of the plunger has enlargement 41 having slight clearance with respect to discharge opening 42 from the chamber 39 to the pipe 32. Toward the shoulder 40 from this enlargement 41, the plunger has reduced portion 43 extending to secondary valve 44 of the plunger coacting in fully shifted position of the plunger to engage seat 45 adjacent the discharge opening 42.

In operation, any air or gas as a compressible medium accumulation in the transmission circuit would tend thereby to disturb the definite control operations or shiftings of the member 21. This compressible medium at all times tends to accumulate in the high points in the circuit. In the instance that the power cylinder be horizontal and the entrance to the exhaust ports from the lower side, the relief valve of this disclosure might be located on the upper side of the cylinder. Importance attaches to locating the relief valve at the high point or points of the transmission. As so located, when the transmission pressure is placed on the circuit, the compressible medium is reduced in volume before the pressure is built up. Such reduced volume of the gas in the line 26 or 27, as the pressure builds up, is relieved by shifting of the plunger 36 to have its enlargement 40 clear the seat 35, by the pressure compressing the spring 37. This insures a quick-pop-off of the compressible medium with escape of such past the enlargement 41 or the reduced portion 43. The clearance of the shoulder 40 as to the cylinder or shell 30 permits gas escape but is tight against oil flow.

The relief of the transmission circuit from this compressible medium means that the retention in the circuit only of the incompressible medium at once builds up the circuit pressure and the plunger 36, unseated from seat 35, seats at the spaced seat 45, and cuts off further escape of fluid from the circuit. At most, there may be a measured or small quantity of incompressible medium escape. However, initially there is only the popping or blowing off of the gas accumulation, if any. Accordingly, there is thus provided in the relief valve of this disclosure, an automatic take off for the compressible medium operating as the transmission circuit is operated. There is thus maintained hydraulic condition for such circuit with a reliability for accurate operation of such circuit.

What is claimed and it is desired to secure by United States Letters Patent is:

1. In a hydraulic transmission comprising a member to be actuated, a liquid flow controller and a circuit from the controller to the member, the combination of a compressible medium relief valve for said circuit embodying a chamber having a pair of seats, an inlet port at one seat and an outlet port at the other seat, and a plunger air pressure actuated toward one of said seats, said plunger having a clearance passage as to the chamber in plunger transit between said seats for an opening interval during said clearance passage for the compressible medium, and a spring normally holding the plunger toward the inlet port.

2. In a hydraulic transmission comprising a member to be actuated, a liquid flow controller and a circuit from the controller to the member, the combination of a pop off valve at a high point of the liquid flow embodying a plunger having a shouldered terminus, a chamber having opposing seats, an inlet port at one seat and an outlet port at the other seat, said plunger having a clearance passage as to the chamber in plunger transit in the chamber between said seats, and a spring in the chamber about the plunger coacting in limiting the valve operation to discharge by urging the plunger against pressure in said circuit to closed position at said terminus, there being a passage from said chamber through which the opposite terminus of the plunger protrudes as a supplemental valve against back flow into chamber upon pressure reduction in said circuit.

3. In a hydraulic transmission comprising a member to be actuated, a liquid flow controller and a circuit from the controller to the member, the combination of a measured volume relief valve at a high point of the liquid flow circuit embodying a chamber having opposing ports, a plunger for simultaneously closing said ports, and a spring in the chamber coacting in limiting the valve operation to discharge by normally urging the plunger against circuit pressure for port closing and the plunger effective as actuated by circuit pressure to open both ports in providing an exhausting interval.

4. In a hydraulic transmission comprising a member to be actuated, a liquid flow controller and a circuit from the controller to the member, the combination of a pressure operated discharge valve for the transmission having two independent spaced closed positions embodying a chamber having opposing ports, a plunger unit having two terminal and an intermediate port coacting portions, there being means normally holding said terminal portions in port closing positions against pressure discharge from the circuit, said plunger intermediate portion shifting to closed position upon discharge operation of the valve.

5. In a hydraulic transmission comprising a member to be actuated, a liquid flow controller and a circuit from the controller to the member, the combination of a pressure operated discharge valve for the transmission embodying a plunger, two spaced seats for valve closing positions of the plunger, there being an inlet port at one of said seats, an outlet port at the other of said seats and the chamber about the plunger providing a passage between the seats, and a spring normally holding the plunger against one of said seats to oppose discharge operation of the valve.

6. In a hydraulic transmission comprising a member to be actuated, a liquid flow controller and a circuit from the controller to the member, the combination of a pressure operated discharge valve for the transmission embodying a plunger, two spaced seats for valve closing positions of the plunger, there being an inlet port at one of said seats and a discharge port at the other of said seats, a spring normally holding the plunger against one of said seats to oppose discharge operation of the valve, and means providing a chamber having a passage about the plunger between said seats.

7. In a hydraulic transmission comprising a member to be actuated, a liquid flow controller and a circuit from the controller to the member, the combination of a pressure operated discharge valve for the transmission for location at a high point of liquid flow and embodying a housing providing a pair of spaced seats and an intermediate chamber, a plunger in the housing, and a spring normally holding the plunger in valve closing position against one of said seats in coacting to limit the valve operation to discharge and said plunger operable upon building up of pressure in the transmission to be shifted into valve closing position at the other of said seats with a spill of compressible medium past the first seat.

In witness whereof I affix my signature.

GEO. E. HALLENBECK.